(12) United States Patent
Patarin et al.

(10) Patent No.: US 6,658,569 B1
(45) Date of Patent: Dec. 2, 2003

(54) SECRET KEY CRYPTOGRAPHIC PROCESS FOR PROTECTING A COMPUTER SYSTEM AGAINST ATTACKS BY PHYSICAL ANALYSIS

(75) Inventors: Jacques Patarin, Viroflay (FR); Louis Goubin, Paris (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/334,687

(22) Filed: Jun. 17, 1999

(51) Int. Cl.[7] ................................................ H04L 1/24
(52) U.S. Cl. ........................ 713/194; 713/155; 713/168; 713/189; 713/193; 713/200; 713/201
(58) Field of Search ............................... 713/155, 168, 713/194, 189, 193, 200, 201

(56) References Cited

U.S. PATENT DOCUMENTS 4,993,068 A * 2/1991 Piosenka et al. ............ 713/186
5,588,059 A * 12/1996 Chandos et al. ............ 380/279
5,850,443 A * 12/1998 Van Oorschot et al. ..... 380/285

FOREIGN PATENT DOCUMENTS

WO 9852319 11/1998

* cited by examiner

*Primary Examiner*—Thomas R. Peeso
(74) *Attorney, Agent, or Firm*—Edward J. Kondracki; Lesley L. Coulson; Miles & Stockbridge P.C.

(57) ABSTRACT

The invention relates to a secret-key cryptographic calculation process for protecting a computer system against physical attacks, wherein a) the standard cryptographic calculation process is separated into several distinct, parallel process parts using partial intermediate results distinct from those of the standard calculation, and b) the final value of the standard cryptographic calculation is reconstructed from the distinct partial intermediate results.

The invention is particularly applicable to computer systems such as embedded systems such as a smart card.

43 Claims, 7 Drawing Sheets

THE DES ALGORITHM

FIG. 1A
*(PRIOR ART)*

THE FUNCTION F OF DES

STANDARD PROCESS

MODIFIED PROCESS

TRANSFORMATION OF AN S BOX

TRANSFORMATION OF AN S BOX (VARIANT NO. 2)

SECRET KEY CRYPTOGRAPHIC PROCESS FOR PROTECTING A COMPUTER SYSTEM AGAINST ATTACKS BY PHYSICAL ANALYSIS

BACKGROUND OF THE INVENTION

1. Field of the Invention

The present invention relates to a process for protecting a computer system implementing a cryptographic algorithm that uses a secret key. More precisely, the purpose of the process is to produce a version of the algorithm that is not vulnerable to a certain type of physical attack—known as Differential Power Analysis or High-Order Differential Power Analysis—aimed at obtaining information on the secret key through a study of the computer system's electric power consumption during the execution of the calculation.

The cryptographic algorithms considered herein use a secret key to calculate output information as a function of input information; this can involve an operation for encryption, decryption, signature, signature verification, authentication or non-repudiation. They are constructed in such a way that in practice, an attacker who knows the inputs and the outputs cannot deduce any information on the secret key itself.

The invention described herein relates to a class larger than that traditionally designated by the expression "secret key algorithms" or "symmetric algorithms." In particular, everything that is described in the present patent application also applies to so-called "public key" algorithms or "asymmetric algorithms," which actually include two keys: one public, the other private and undisclosed, the latter being the one targeted by the attacks described below.

2. Description of Related Art

Attacks of the type known as Power Analysis, developed by Paul Kocher and Cryptographic Research (see the document *Introduction to Differential Power Analysis and Related Attacks* by Paul Kocher, Joshua Jaffe, and Benjamin Jun, Cryptography Research, 870 Market Street, Suite 1008, San Francisco, Calif. 94102; published as an HTML document at the URL address: http://www.cryptography.com/dpa/technical/index.html, introduced into the present application as a reference) is based on the observation that, in reality, an attacker can acquire information other than just the input and output data during the execution of the calculation such as, for example, the electric power consumption of the microcontroller or the electromagnetic radiation emitted by the circuit.

Differential Power Analysis, abbreviated DPA, is an attack that makes it possible to obtain information on the secret key contained in the computer system by performing a statistical analysis on power consumption measurements performed on a large number of calculations with this same key.

As a non-limiting example, the case of the DES (Data Encryption Standard) algorithm, a description of which can be found in any of the following named documents will be considered:

FIPS PUB 46-2, *Data Encryption Standard*, 1994;
FIPS PUB 74, *Guidelines for Implementing and Using the NBS Data Encryption Standard*, 1981;
ANSI X3.92 *American National Standard, Data Encryption Algorithm*, 1981;
ISO/IEC 8731:1987, *Banking—Approved Algorithms for Message Authentication—Part 1: Data Encryption Algorithm (DEA)*;

or in the following book:
Bruce Schneier, *Applied Cryptography, 2nd Edition*, John Wiley & Sons, 1996, page 270.

The above-mentioned documents are introduced into the present application as references.

Figure 1A:
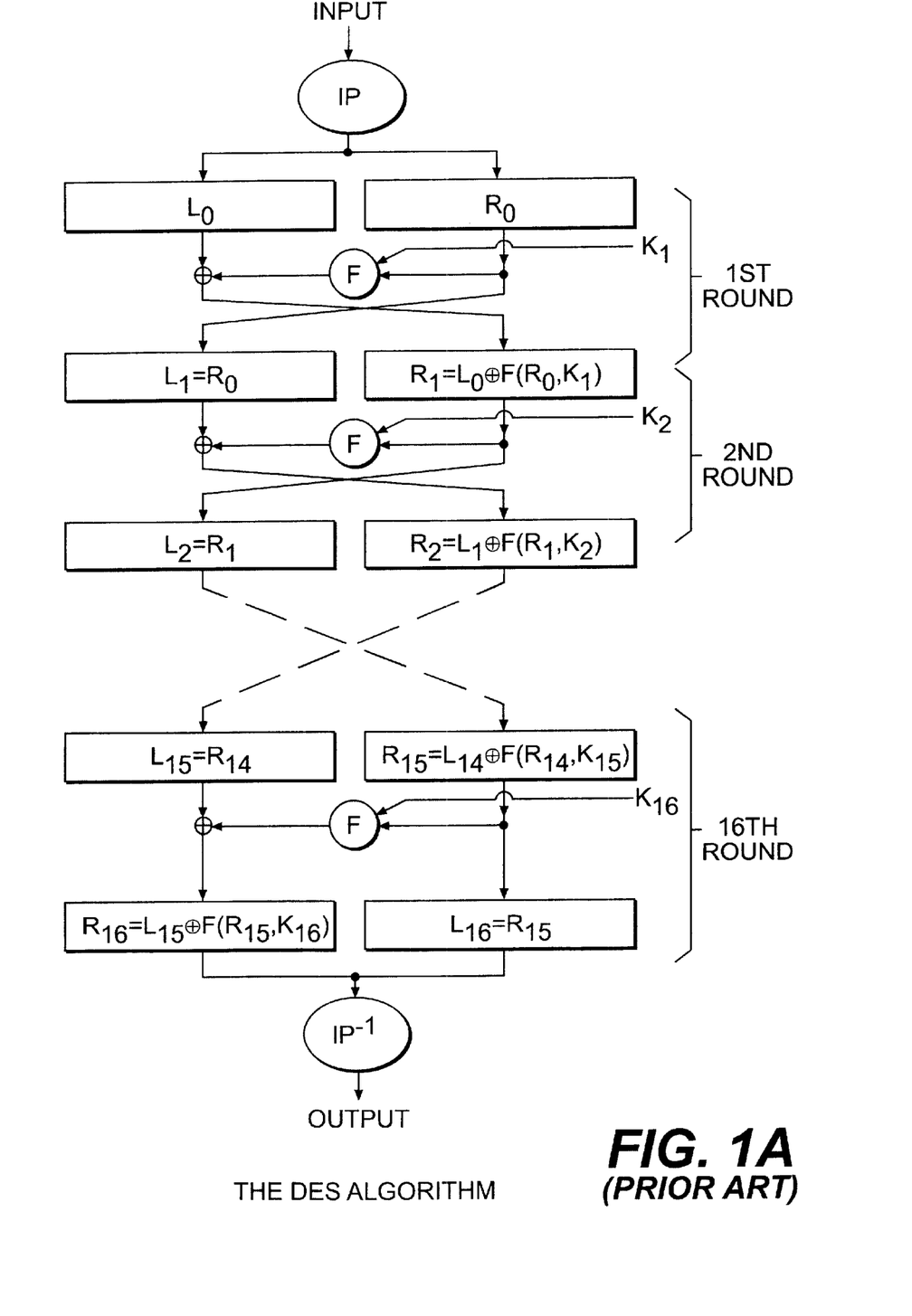
Figure 1B:
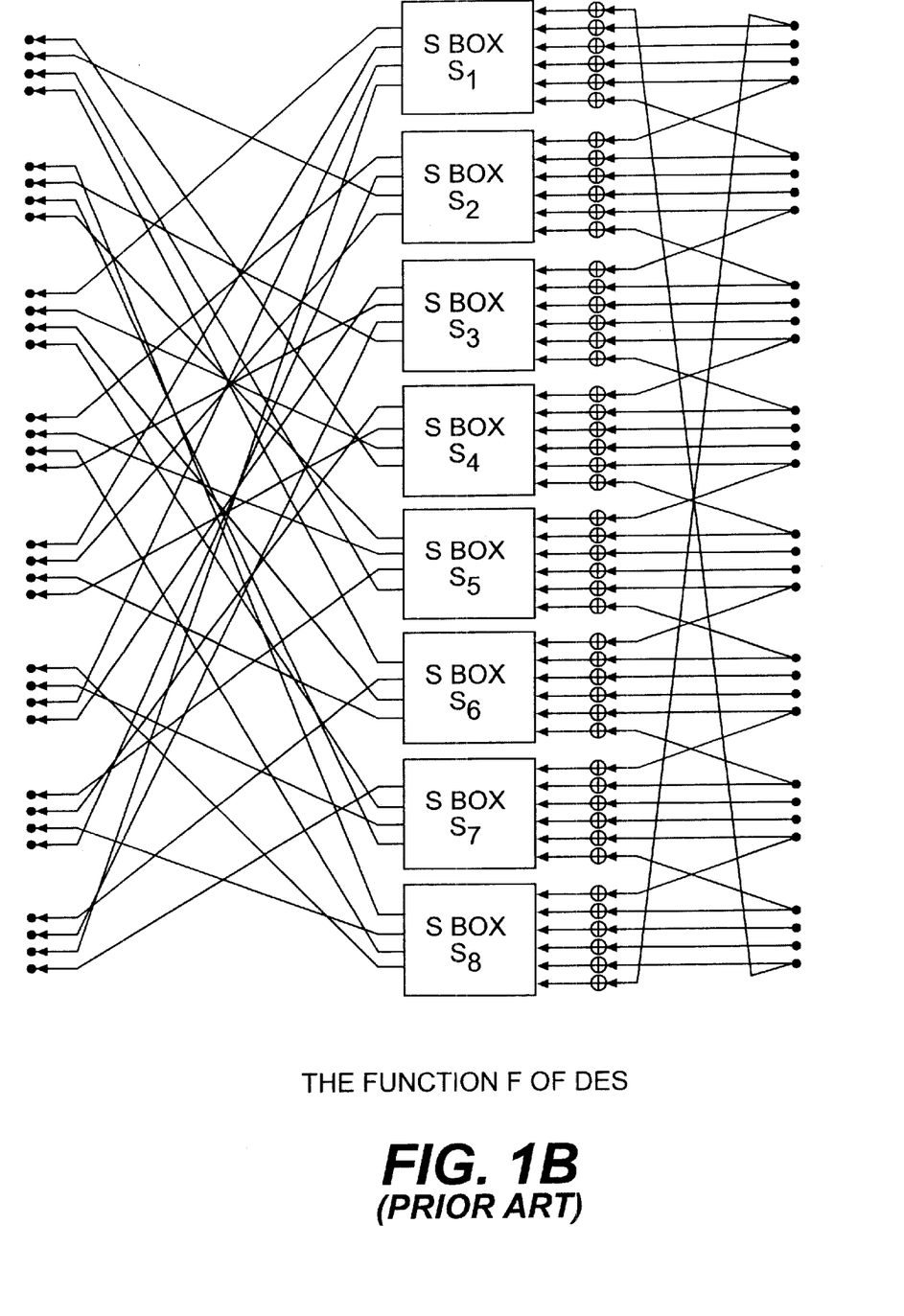

The DES algorithm is executed in 16 steps known as rounds (see FIG. 1a). In each of the 16 rounds, a transformation F into 32 bits is performed. This transformation F uses eight nonlinear transformations of 6 bits to four bits, each of which is coded into a table called an S box (see FIG. 1b, in which the S boxes are marked $S_1, S_2, \ldots, S_8$.

A DPA attack on the DES can be implemented in the following way:

1st step: Power consumption measurements are made on the first round, for 1,000 DES calculations. The input values of these 1,000 calculations are marked $E[1], \ldots, E[1,000]$. The corresponding 1,000 power consumption curves measured during these calculations are marked $C[1], \ldots, C[1,000]$. The average curve CM of the 1,000 consumption curves is also calculated.

2nd step: The first bit output from the first S box during the first round is selected. Let b be the value of this bit. It is easy to see that b is only dependent on 6 bits of the secret key. The attacker forms a hypothesis on the 6 bits in question. He calculates—from these 6 bits and from the E[i]s—the corresponding theoretical values for b. This makes it possible to separate the 1,000 inputs $E[1], \ldots, E[1,000]$ into two categories: those that result in b=0, and those that result in b=1.

3rd step: Next, the average CM' of the curves corresponding to inputs of the first category, i.e., those for which b=0, is calculated. If CM and CM' show a notable difference, the values retained for the 6 key bits are considered to be the correct ones. If CM and CM' do not show any substantial difference in the statistical sense, i.e., no difference that is clearly greater than the typical difference from the noise measured, the 2nd step is repeated with another choice for the 6 bits.

4th step: Steps 2 and 3 are repeated with a target bit b output from the second S box, then from the third S box, and so on, through the eighth S box. Thus, 48 bits of the secret key are eventually obtained.

5th step: The remaining 8 bits can be found by a thorough search.

This attack does not require any knowledge of the individual power consumption of each instruction, or of the chronological position of each of these instructions. It applies in the same way whenever it may be assumed that the attacker knows some of the outputs of the algorithm and the corresponding consumption curves. It is based only on the fundamental hypothesis according to which:

Fundamental Hypothesis

There is an intermediate variable, appearing during the calculation of the algorithm, such that the knowledge of some key bits, in practice less than 32 bits, makes it possible to determine whether two inputs, and respectively two outputs, do or do not result in the same value for this variable.

All of the algorithms, like the DES, that use S boxes are potentially vulnerable to DPA, since the normal modes of implementation generally fall within the scope of the above-mentioned hypothesis.

The attacks known as High-Order Differential Power Analysis, abbreviated HO-DPA, are a generalization of the DPA attack described above. They can use several different sources of information; in addition to power consumption, they can involve measurements of electromagnetic radiation, temperature, etc., and can use statistical operations that are more sophisticated than the simple concept of an average, and intermediate variables (generalizing the bit b defined above) that are less elementary. Nonetheless, they are based on exactly the same fundamental hypothesis as DPA.

SUMMARY OF THE INVENTION

The object of the process that is the subject of the present invention is to eliminate the risks of DPA or HO-DPA attacks on computer systems using secret or private key cryptography.

Consequently, another subject of the present invention is a modification of the cryptographic calculation process implemented by protected computer systems using cryptography such that the above-mentioned fundamental hypothesis is no longer verified, in other words, no intermediate variable is dependent on the power consumption of an easily accessible subsystem of the private or secret key, attacks of the DPA or HO-DPA type thus being rendered inoperative.

The process for protecting a computer system implementing a standard cryptographic calculation process that uses a secret key, which is the subject of the present invention, is remarkable in that the cryptographic calculation process is separated into several distinct calculation parts, executed in parallel and producing partial intermediate results distinct from those of the standard cryptographic calculation, and in that the final value obtained by the standard calculation without a separation is reconstructed from the distinct partial intermediate results. The term standard cryptographic calculation process is intended to mean any sequential or successive calculation process that makes it possible to obtain encrypted values, decrypted values, and signature, signature verification, authentication, and non-repudiation values. A process of this type makes it possible to prevent DPA or HO-DPA type attacks against embedded systems equipped with cryptographic calculation functions, such as smart cards dedicated to credit card, ATM card, access control card or similar functions.

BRIEF DESCRIPTION OF THE DRAWINGS

The invention will be better understood through a reading of the description and an examination of the drawings below, in which, in addition to FIGS. 1a and 1b relative to the prior art in connection with the encryption/decryption process of the DES, or "Data Encryption Standard".

DESCRIPTION OF THE PREFERRED EMBODIMENT(S)

A more detailed description of the process for protecting a computer system implementing a standard cryptographic calculation process that uses a secret key, which is the subject of the invention, will now be provided in connection with the above-mentioned figures.

Generally, the process that is the subject of the present invention consists, for a standard cryptographic process that uses a secret or private key Ks, of modifying the cryptographic calculation process so that the above-mentioned fundamental hypothesis is no longer verified, and there is no longer any intermediate variable calculated, according to the process that is the subject of the present invention, that is dependent on the knowledge of an easily accessible subsystem of the secret key.

Figure 2:
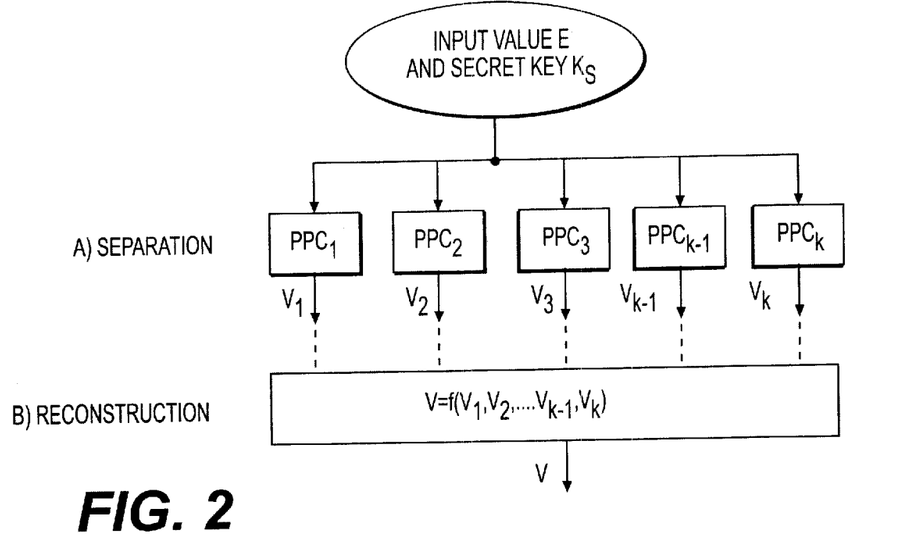
FIG. 2 represents a general flow chart illustrating the process that is the subject of the invention.

To this end, and in accordance with the process that is the subject of the present invention as represented in FIG. 2, a) the standard cryptographic calculation process is separated into several distinct calculation process parts $PPC_1$ through $PPC_k$ executed in parallel, then b) the final value v corresponding to that obtained by the standard cryptographic calculation process without a separation is reconstructed from the distinct partial intermediate results $v_1$ through $v_k$ obtained by implementing the above-mentioned distinct calculation process parts $PPC_1$ through $PPC_k$.

Thus, the calculation process parts are independent, but the partial intermediate variables or results are linked.

This separation is performed by replacing each intermediate variable v occurring during the calculation and depending on input (or output) data, with k variables, $v_1, v2, \ldots, v_k$, such that $v_1, v2 \ldots,$ and $v_k$ make it possible, as necessary, to reconstruct v. More precisely, this means that there is a function f such that $v=f(v_1, v2 \ldots, v_k)$. Moreover, it is noted that f preferably meets the following conditions:

Condition No. 1

Let i be a subscript, in the broadest sense, between 1 and k. The knowledge of a value v never makes it possible in practice to deduce information on all of the values $v_i$ such that there is a (k−1)-tuple $(v_i, \ldots, v_{i-1}, v_{i+1}, \ldots, v_k)$ that satisfies the equation $f(v_i, \ldots, v_k)=v$;

Example No. 1

If we take the function $f(v_i, \ldots, v_k)=v_1 \oplus v_2 \oplus \ldots \oplus v_k$, where $\oplus$ indicates the bit-by-bit "exclusive-OR" function, condition No. 1 is clearly met, since, for any subscript i between 1 and k, the considered set of values $v_i$ contains all of the possible values, and therefore does not depend on v.

Example No. 2

If we consider a variable v with values in the multiplicative group of Z/nz, i.e., all of the modulo n integers that have an inverse that is also modulo n, we can take the function $f(v_i, \ldots, v_k)=v_1 \cdot v_2 \cdot \ldots v_k$ mod n, where the new variables $v_1, v_2, \ldots, v_k$ also have values in the multiplicative group of Z/nZ. Condition No. 1 is also clearly met, since, for any subscript i between 1 and k, the considered set of values $v_i$ contains all of the possible values, and therefore does not depend on v.

According to a remarkable aspect of the process that is the subject of the invention, a "translation" of the algorithm is then performed by replacing each intermediate variable v that is dependent on input (or output) data, with the k variables $v_1, v_2, \ldots, v_k$. In order to guarantee the maximum security of the modified algorithm in its new form, the following additional condition is imposed on the function f:

Condition No. 2

The function f is such that the transformations to be performed on $v_1, v_2, \ldots,$ or $v_k$ during the calculation instead of the usual transformations performed on v can be executed without having to recalculate v.

First Example: the DES

Figure 3A:
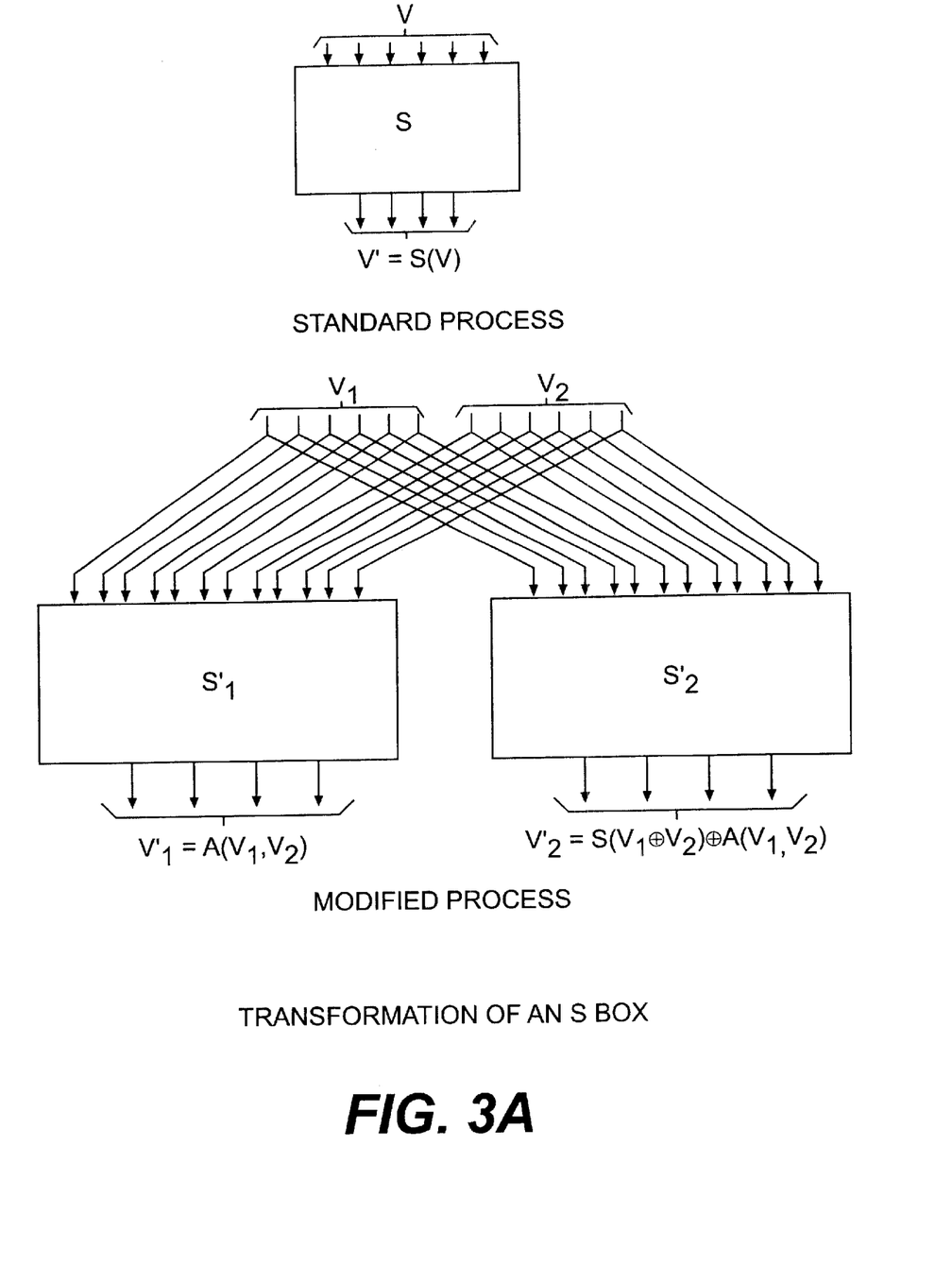
FIG. 3a represents an example illustrating a non-limiting mode of implementation of the process that is the subject of the present invention.

A first example relative to the protection of the DES is described in connection with FIG. 3a.

In this example, the particular case of the DES is examined. In this case, we choose a separation of each intermediate variable v occurring during the calculation and depending on input or output data into two variables $v_1$ and $v_2$, i.e., we take k=2. We consider the function $f(v_1, v_2)=v=v_1 \oplus v_2$ of Example No. 1 above, which in its construction satisfies Condition No. 1. From the construction of the algorithm, it is easy to see that the transformations it performs on v always fall within one of the following five categories:

permutation of the bits of v;

expansion of the bits of v;

exclusive-OR of v with another variable v' of the same type;

exclusive-OR of v with a variable c dependent only on the key or on a sub-key;

nonlinear transformation of v by an S box.

The first two categories correspond to linear transformations on the bits of the variable v. For these, Condition No. 2 is therefore very easy to verify: instead of the transformation normally performed on v, one need only perform the permutation or the expansion on $v_1$, then on $v_2$, and the relation $f(v_1, v_2)=v$ that was true before the transformation remains equally true afterward.

Likewise, in the third case, one need only replace the calculation of $v''=v \oplus v'$ with that of $v''_1 = v_1 \oplus v'_1$ and of $v''_2 = v_2 \oplus v'_2$. The relations $f(v_1, v_2)=v$ and $f(v'_1, v'_2)=v'$ clearly yield $f(v''_1, v''_2)=v''$, and Condition No. 2 is again verified.

In the exclusive-OR of v with a variable c dependent only on the key or a sub-key, Condition No. 2 is also very easy to satisfy: one need only replace the calculation of $v \oplus c$ with $v_1 \oplus c$ or $v_2 \oplus c$, which fulfills Condition No. 2.

Finally, instead of the nonlinear transformation $v'=S(v)$, presented in the form of an S box, which in this example takes inputs of 6 bits and yields outputs of 4 bits the transformation $(v'_1, v'_2)=S'(v_1, v'_2)$ is performed by means of two new S boxes, each being in this case 12 from bits to 4 bits. In order to guarantee the equality $f(v'_1, v'_2)=v'$, one need only choose:

$$(v'_1, v'_2)=S'(v'_1, v'_2)=(A(v_1, v_2), S(v_1 \oplus v_2) \oplus A(v_1, v_2))$$

i.e., $v'_1=A(v_1, v_2)$ and $v'_2=S(v_1 \oplus v_2) \oplus A(v_1, v_2)$ where A designates a secret, random transformation of 12 bits to 4 bits. The first (new) S box corresponds to the table of the transformation $(v_1, v_2) \to A(v_1, v_2)$ which associates $(v_1, v_2)$ with $A(v_1, v_2)$, and the second (new) S box corresponds to the table of the transformation $(v_1, v_2) \to S(v_1 \oplus v_2) \oplus A(v_1, v_2)$ which associates $(v_1, v_2)$ with $S(v_1 \oplus v_2) \oplus A(v_1, v_2)$. The presence of the random function A makes it possible to guarantee Condition No. 1. Moreover, the utilization of tables makes it possible to avoid having to calculate $v_1 \oplus v_2$ and thus makes it possible to satisfy Condition No. 2.

The transformation or conversion tables can be stored in a ROM of the smart card when the computer system is constituted by a smart card.

Figure 3B:
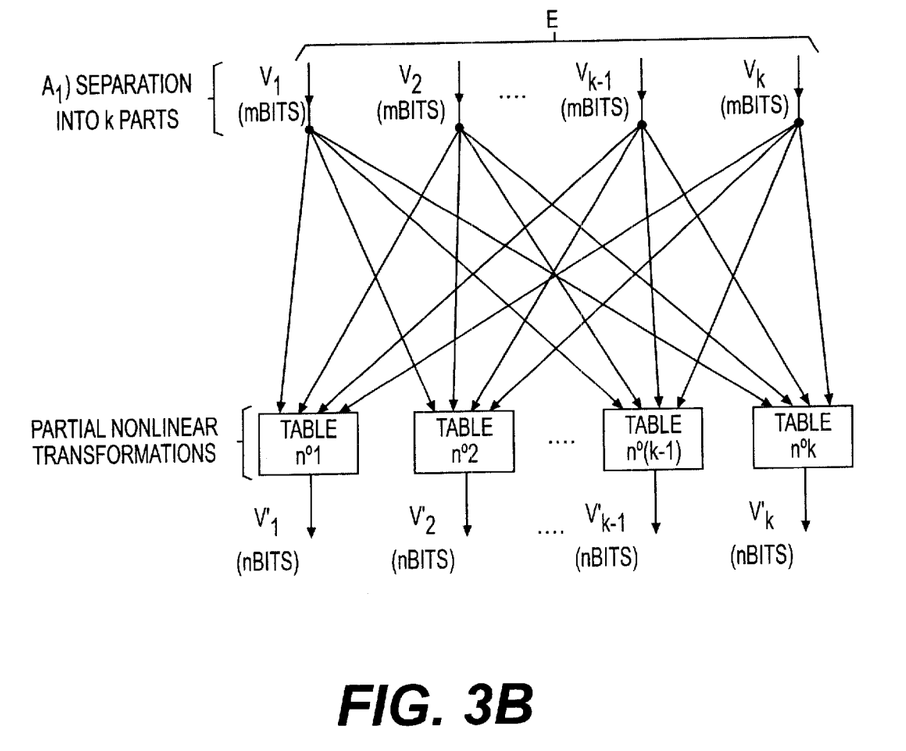
FIG. 3b represents an example illustrating a flow chart of a particular implementation of the process that is the subject of the invention, applied to a nonlinear transformation used in a standard cryptographic calculation process such as the DES.

Thus, for a calculation step of the nonlinear transformation type used by a standard cryptographic calculation process such as the DES, the separation, as represented in FIG. 3b, can be into k parts. For a standard cryptographic calculation process using nonlinear transformations of m bits to n bits, described by conversion tables in which the n output bits of the transformation are read at an address that is a function of the m input bits, each nonlinear transformation applied to an intermediate variable playing the role of an input variable E of the standard cryptographic calculation process without a separation is replaced by a partial nonlinear transformation of km bits to kn bits applied to all of the partial intermediate variables $v_1$ through $v_k$. According to a particularly remarkable aspect of the process that is the subject of the invention, this partial nonlinear transformation is described and implemented by k partial conversion tables in which the n output bits $v'_1$ or $v'_2, \ldots,$ or $v'_k$ of the transformation are read at an address that is a function of the km input bits.

In the first example mentioned above, and in connection with FIG. 3b, it is indicated that k=2, n=4, and m=6.

Variant No. 1

For purposes of saving space in the ROM, it is entirely possible to use the same random function A for each of the eight S boxes of the standard description of the DES, thus making it possible to have only nine new S boxes to store instead of sixteen.

Figure 3C:
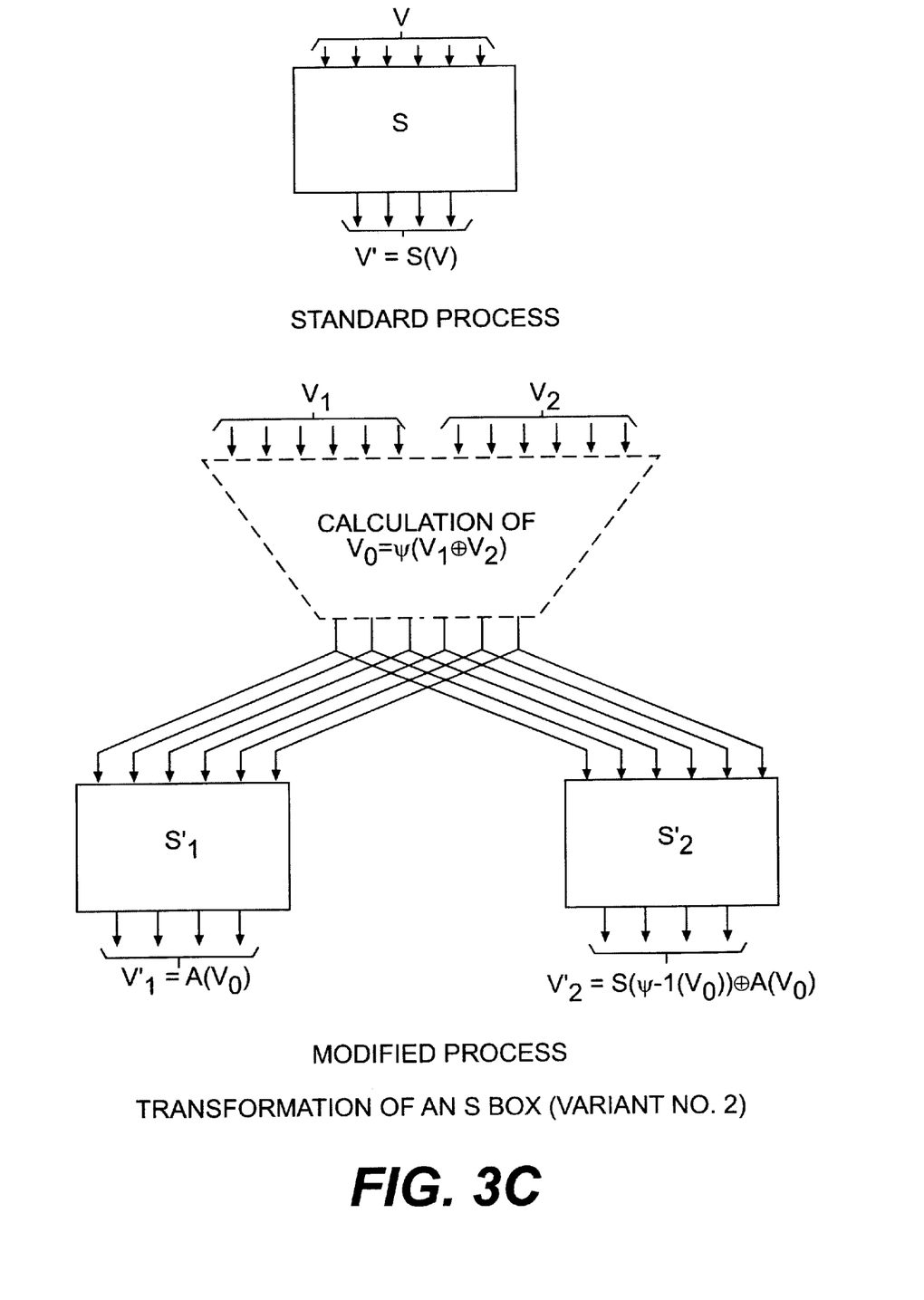
FIG. 3c represents a variant of the implementation of the process that is the subject of the invention as illustrated in FIG. 2.

A variant, Variant No. 2, will be described in connection with FIG. 3c.

Variant No. 2

To reduce the size of the ROM required to store the S boxes, it is also possible to use the following method: instead of each nonlinear transformation $v'=S(v)$ of the initial implementation presented in the form of an S box (which in the example of the DES takes inputs of 6 bits and yields outputs of 4 bits), the transformation $(v'_1, v'_2)=S'(v_1, v_2)$ is performed by means of two S boxes, each being in this case from 6 bits to 4 bits. The initial implementation of the calculation of $v'=S(v)$ is replaced by the following two successive calculations:

$$v_0=\phi(v_1 \oplus v_2)$$

$$(v'_1, v'_2)=S'(v_1, v_2)=(A(v_0), S(\phi^{-1}(v_0)) \oplus A(v_0))$$

i.e. $(v'_1)=A(v_0)$, $v'2=S((\phi^{-1}(v_0)) \oplus A(v_0)$
where $\phi$ is a secret, bijective function of 6 bits to 6 bits, and where A designates a secret, random transformation of 6 bits to 4 bits. The first (new) S box corresponds to the table of the transformation $v_0 \to A(v_0)$ which associates $v_0$ with $A(v_0)$ and the second (new) S box corresponds to the table of the transformation $v_0 \to S(\phi^{-1}(v_0)) \oplus A(v_0)$ which associates $v_0$ with $S(\phi^{-1}(v_0)) \oplus A(v_0)$. By construction, we still have the equality $f(v'_1, v'_2)=v'$. The presence of the random function A makes it possible to guarantee Condition No. 1. The utilization of tables makes it possible to avoid having to calculate $\phi^{-1}(v_0)=v_1 \oplus v_2$.

Figure 3D:
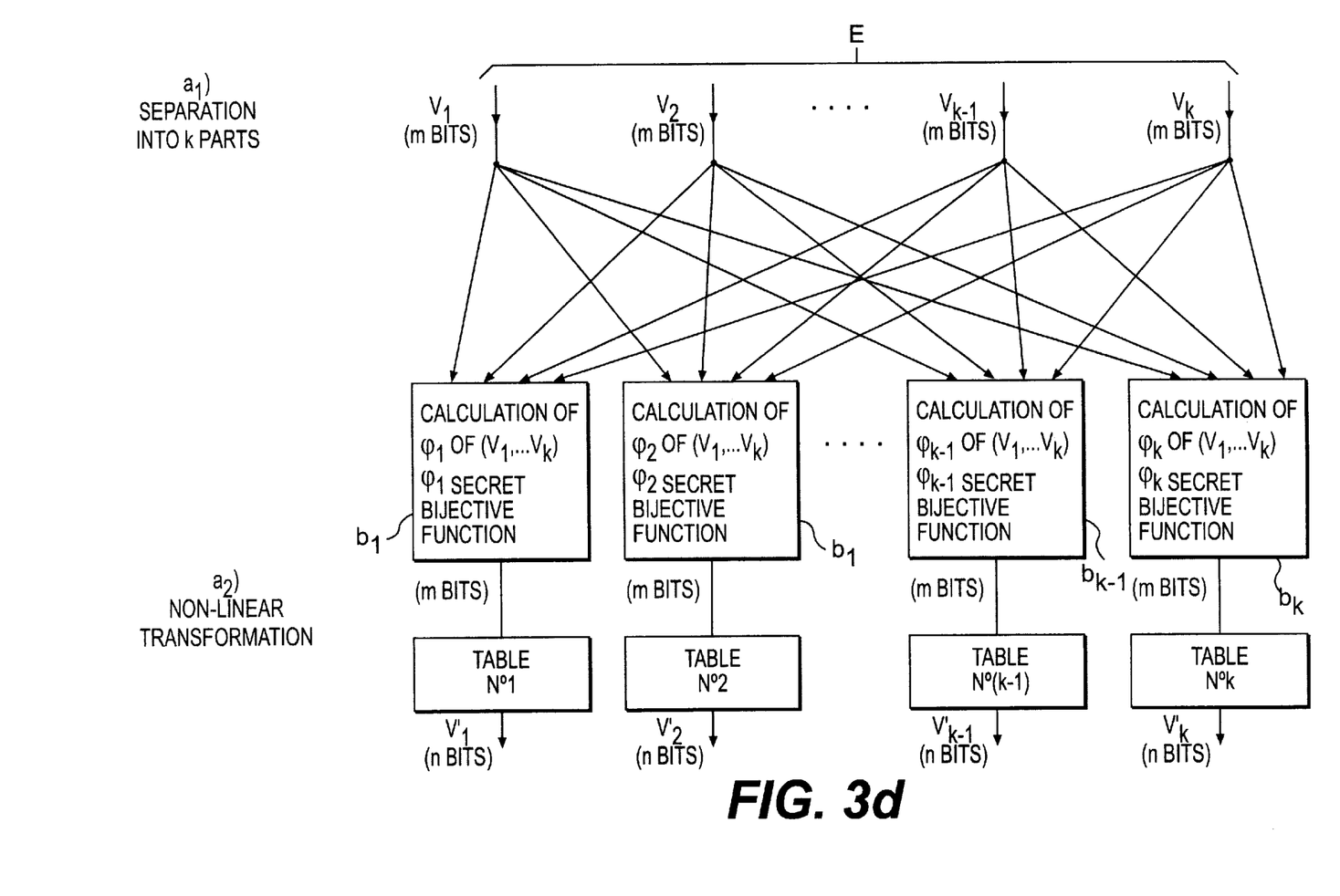
FIG. 3d represents an example illustrating a flow chart of another particular implementation of the process that is the subject of the invention, based on a secret bijective transformation applied to a nonlinear transformation used in a standard cryptographic calculation process such as the DES.

FIG. 3d represents a corresponding calculation step of the nonlinear transformation type used within the framework of a standard cryptographic calculation process such as the DES, as modified in accordance with the process that is the subject of the invention, according to Variant No. 2. In addition to the separation into k parts applied to the input variable E, for the nonlinear transformations of m bits to n bits, described by conversion tables in which the n output bits are read at an address that is a function of the m input bits, each nonlinear transformation applied to an intermediate variable playing the role of an input variable E of the standard calculation process is replaced by a partial nonlinear transformation of km bits to kn bits applied to all of the partial intermediate variables $v_1$ through $v_k$. This partial nonlinear transformation is described and implemented by k conversion tables, each of the inputs of the conversion tables receiving a value obtained by applying a secret bijective function $\phi_j$ to the function $f(v_1, \ldots, v_k)$ of the partial intermediate variables according to the relation $\phi_j \bigcirc f(v_1, \ldots, v_k)$ with $j \in [1, k]$.

According to a particularly remarkable aspect of the process that is the subject of the present invention, the above-mentioned application $\phi_j \bigcirc f(v_1, \ldots, v_k)$ is performed by direct evaluation of a resulting value, which, applied to the input of the corresponding conversion table 1 through k, makes it possible to read n output bits of the transformation $v'_1$ or $v'_2$ or $\ldots v'_k$ at an address that is a function of these m input bits.

Just as in the first example mentioned above in connection with FIG. 3d, it is indicated that for Variant No. 2, k=2, m=6 and n=4.

Moreover, in a simplified version, the bijective functions $\phi_1$ and $\phi_k$ are identical.

In order for Condition No. 2 to be satisfied, it is still necessary to choose the bijective transformation $\phi$ or bijective functions $\phi_1$ through $\phi_k$ so that the calculation of $v_0 = \phi(v_1 \oplus v_2)$ can take place without having to recalculate $v_1 \oplus v_2$. Two examples of a choice for the function $\phi$ are given below:

EXAMPLE 1

A Linear Bisection $\phi$

A secret, bijective linear function of 6 bits to 6 bits is chosen for $\phi$. Within the framework of such a choice, all of the 6-bit values are considered as a vectorial space with a dimension of 6 in the finite field $F_2$ with two elements. In practice, choosing $\phi$ amounts to choosing a random invertible six-by-six matrix whose coefficients equal 0 or 1. With this choice of $\phi$, it is easy to see that Condition No. 2 is satisfied. In effect—in order to calculate $\phi(v_1 \oplus v_2)$—one need only calculate $\phi(v_1)$, then $\phi(v_2)$, and finally, calculate the "exclusive-OR" of the two results obtained.

For example, the matrix $$\begin{bmatrix} 1 & 1 & 0 & 1 & 0 & 0 \\ 1 & 1 & 0 & 1 & 0 & 1 \\ 0 & 1 & 1 & 0 & 1 & 0 \\ 1 & 1 & 1 & 0 & 1 & 0 \\ 0 & 1 & 1 & 1 & 1 & 0 \\ 0 & 0 & 1 & 1 & 0 & 1 \end{bmatrix}$$

is invertible. It corresponds to the linear bijection $\phi$ of 6bits over 4 bits defined by:

$$\phi(u_1, u_2, u_3, u_4, u_5, u_6) = u_1 \oplus u_2 \oplus u_4, u_1 \oplus u_2 \oplus u_4 \oplus u_6, u_2 \oplus u_3 \oplus u_5, u_1 \oplus u_2 \oplus u_3 \oplus u_5, u_2 \oplus u_3 \oplus u_4 \oplus u_5, \oplus u_3 \oplus u_4 \oplus u_6)$$

If it is noted that $v_1 = (v_{1.1}, v_{1.2}, v_{1.3}, v_{1.4}, v_{1.5}, v_{1.6})$ and $v_2 = (v_{2.1}, v_{2.2}, v_{2.3}, v_{2.3}, v_{2.5}, v_{2.6})$, then in order to calculate $\phi(v_1 \oplus v_2)$, one successively calculates:

$$\phi(v_1) = (v_{1.1} \oplus v_{1.2} \oplus v_{1.4}, v_{1.1} \oplus v_{1.2} \oplus v_{1.4} \oplus v_{1.6}, v_{1.2} \oplus v_{1.3} \oplus v_{1.5}, v_{1.1} \oplus v_{1.2} \oplus v_{1.3} \oplus v_{1.5}, v_{1.2} \oplus v_{1.3} \oplus v_{1.4} \oplus v_{1.5}, v_{1.3} \oplus v_{1.4} \oplus v_{1.6});$$

$$\phi(v_2) = v_{2.1} \oplus v_{2.2} \oplus v_{2.4}, v_{2.1} \oplus v_{2.2} \oplus v_{2.4} \oplus v_{2.6}, v_{2.2} \oplus v_{2.3} \oplus v_{2.5} \oplus, v_{2.1} \oplus v_{2.2} \oplus v_{2.3} \oplus v_{2.5}, v_{2.2} \oplus v_{2.3} \oplus v_{2.4} \oplus v_{2.5}, v_{2.3} \oplus v_{2.4} \oplus v_{2.6}).$$

Then, the "exclusive-OR" of the two results obtained is calculated.

EXAMPLE 2

A Quadratic Bijection $\phi$

A secret, bijective quadratic function of 6 bits to 6 bits is chosen for $\phi$. The term "quadratic" in this case indicates that each value bit output from the function $\phi$ is expressed by a polynomial function with a degree of two of the 6 input bits, which are identified with 6 elements of the finite field $F_3$. In practice, it is possible to choose the function $\phi$ defined by the formula $\phi(x) = t(s(x)^5)$ where s is a secret, bijective linear application of $(F_2)^6$ to L, t is a secret, bijective linear application of L to $(F_2)^6$, and where L designates an algebraic extension with a degree of 6 of the finite field $F_2$. The bijective nature of this function $\phi$ results from the fact that $a \to a^5$ is a bijection on the extension L (whose inverse is $b \to b^{38}$). In order to establish whether Condition No. 2 is still satisfied, one need only determine whether it is possible to write:

$$\phi(v_1 \oplus v_2) = \psi(v_1, v_1) \oplus \psi(v_1, v_2) \oplus \psi(v_2, v_1) \oplus \psi(v_2, v_2)$$

where the function $\psi$ is defined by $\psi(x, y) = t(s(x)^4 \cdot s(y))$.

For example, if L is identified with $F_2[X]/(X^6 + X + 1)$, and if s and t are taken to be respective matrixes:

$$\begin{bmatrix} 1 & 1 & 0 & 1 & 0 & 0 \\ 1 & 1 & 0 & 1 & 0 & 1 \\ 0 & 1 & 1 & 0 & 1 & 0 \\ 1 & 1 & 1 & 0 & 1 & 0 \\ 0 & 1 & 1 & 1 & 1 & 0 \\ 0 & 0 & 1 & 1 & 0 & 1 \end{bmatrix} \text{ and } \begin{bmatrix} 0 & 1 & 0 & 0 & 1 & 1 \\ 1 & 1 & 0 & 1 & 0 & 0 \\ 1 & 0 & 1 & 0 & 1 & 1 \\ 0 & 1 & 1 & 1 & 0 & 0 \\ 1 & 0 & 1 & 0 & 1 & 0 \\ 0 & 0 & 1 & 0 & 1 & 1 \end{bmatrix}$$

with respect to the base $(1, X, X^2, X^3, X^4, X^5)$ of L in $F_2$ and to the canonical base of $(F_2)^6$ in $F_2$, the following quadratic bijection $\phi$ of 6 bits to 6 bits is obtained:

$$\phi(u_1, u_2 u_3 u_4 u_5 u_6) =$$

$$(u_2 u_5 \oplus u_1 u_4 \oplus u_4 u_6 \oplus u_6 u_2 \oplus u_4 u_6 \oplus u_2 u_5$$

$$\oplus u_3 \oplus u_4 u_3,$$

$$u_2 u_5 \oplus u_5 u_1 \oplus u_1 u_4 \oplus u_4 u_6 \oplus u_4 u_5 \oplus u_2 u_3$$

$$\oplus u_3 u_1,$$

$$u_2 u_5 \oplus u_5 u_1 \oplus u_6 u_5 \oplus u_1 u_4 \oplus u_3 u_5 \oplus u_1 u_4 u_6$$

$$\oplus u_6 u_3 \oplus u_4 u_3 \oplus u_3 u_1,$$

$$u_2 u_4 \oplus u_2 u_3 \oplus u_6 u_1 \oplus u_4 u_6 \oplus u_5 u_6 u_3 \oplus u_4 u_3,$$

$$u_5 u_1 \oplus u_1 u_4 \oplus u_6 u_3 u_5 \oplus u_4 u_5 \oplus u_1 \oplus u_6 u_1 \oplus$$

$$u_4 u_6 \oplus u_3 \oplus u_6 u_3 \oplus$$

$$u_4 u_2,$$

$$u_4 \oplus u_6 \oplus u_3 u_5 \oplus u_1 \oplus u_4 u_6 \oplus u_6 u_3).$$

In order to calculate $\phi(v_1 \oplus v_2)$, the function $\psi(x,y) = t(s(x)^4 \cdot s(y))$ of 12 bits to 6 bits is used, which gives the 6 output bits as a function of the 12 input bits in accordance with the following rules:

$\psi(x_1, x_2, x_3, x_4, x_5, x_6, y_1, y_2, y_3, y_4, y_5, y_6) =$ $(x_3y_5 \oplus x_6y_2 \oplus x_6y_3 \oplus x_6y_4 \oplus x_3y_1 \oplus x_6y_1 \oplus$ $x_1y_3 \oplus x_1y_5 \oplus x_5y_2 \oplus x_5y_5$ $\oplus x_5y_1 \oplus x_6y_6 \oplus x_1y_6 \oplus x_1y_2 \oplus x_1y_4 \oplus x_2y_1 \oplus$ $x_2y_2 \oplus x_4y_4 \oplus x_3y_3 \oplus x_3y_6$ $\oplus x_4y_3 \oplus x_5y_3,$ $x_4y_5 \oplus x_3y_1 \oplus x_6y_1 \oplus x_2y_5 \oplus x_5y_1 \oplus x_6y_6 \oplus$ $x_1y_6 \oplus x_1y_2 \oplus x_2y_1 \oplus x_2y_2 \oplus$ $x_4y_1 \oplus x_4y_4 \oplus x_3y_3,$ $x_6y_2 \oplus x_6y_3 \oplus x_6y_4 \oplus x_6y_5 \oplus x_3y_1 \oplus x_6y_1 \oplus$ $x_2y_5 \oplus x_5y_1 \oplus x_1y_6 \oplus x_1y_1 \oplus$ $x_1y_2 \oplus x_1y_4 \oplus x_2y_1 \oplus x_2y_4 \oplus x_4y_2 \oplus x_2y_6 \oplus$ $x_3y_4 \oplus x_5y_3,$ $x_3y_1 \oplus x_6y_2 \oplus x_2y_6 \oplus x_5y_3 \oplus x_5y_4 \oplus x_5y_6 \oplus$ $x_6y_3 \oplus x_2y_3 \oplus x_4y_6 \oplus x_6y_5 \oplus$ $x_1y_3 \oplus x_5y_5 \oplus x_2y_4 \oplus x_4y_2 \oplus x_4y_5 \oplus x_3y_5 \oplus$ $x_4y_3 \oplus x_6y_1 \oplus x_4y_1,$ $x_3y_1 \oplus x_6y_1 \oplus x_5y_3 \oplus x_5y_6 \oplus x_5y_2 \oplus x_1y_5 \oplus$ $x_1y_1 \oplus x_1y_2 \oplus x_2y_1 \oplus x_2y_3 \oplus$ $x_3y_6 \oplus x_6y_5 \oplus x_1y_3 \oplus x_2y_4 \oplus x_3y_3 \oplus x_4y_5 \oplus$ $x_2y_5 \oplus x_6y_1 \oplus x_4y_1 \oplus x_6y_4 \oplus$ $x_3y_2,$ $x_6y_6 \oplus x_4y_4 \oplus x_5y_4 \oplus x_5y_6 \oplus x_6y_3 \oplus x_1y_6 \oplus$ $x_1y_1 \oplus x_1y_2 \oplus x_2y_1 \oplus x_6y_5 \oplus$ $x_2y_4 \oplus x_4y_2 \oplus x_4y_5 \oplus x_3y_5 \oplus x_6y_1 \oplus x_6y_4).$ Using these formulas, the following are calculated successively:

$\psi(v_1, v_1);$ $\psi(v_1, v_2);$ $\psi(v_2, v_1);$ $\psi(v_2, v_2);$

Then, the "exclusive-OR" of the four results obtained is calculated.

Variant No. 3

Again in order to reduce the ROM size required to store the S boxes, it is also possible to simultaneously apply the concepts of both of the preceding variants, Variant No. 1 and Variant No. 2: Variant No. 2 is used with the same secret bijection φ (of six bits to 6 bits) and the same secret random function A (of six bits to 6 bits) in the new implementation of each nonlinear transformation presented in the form of an S box.

Variant No. 4

In this last variant, instead of implementing the transformation $(v'_1, v'_2)=S'(v_1, v_2)$, by means of two S boxes, which replaces the nonlinear transformation $v'=S(v)$ of the initial implementation that was presented in the form of one S box, the calculation of $v'_1$, and respectively $v'_2$, is performed by means of a simple algebraic function, for which the bits of $v'_1$, and respectively $v'_2$, are given by a polynomial function with a total degree of 1 or 2 of the bits of $v_1$ and $v_2$, then $v'_2$, and respectively $v'_1$, are calculated by means of a table. This also makes it possible to reduce the size of the ROM required for the hardware execution.

Figure 3E:
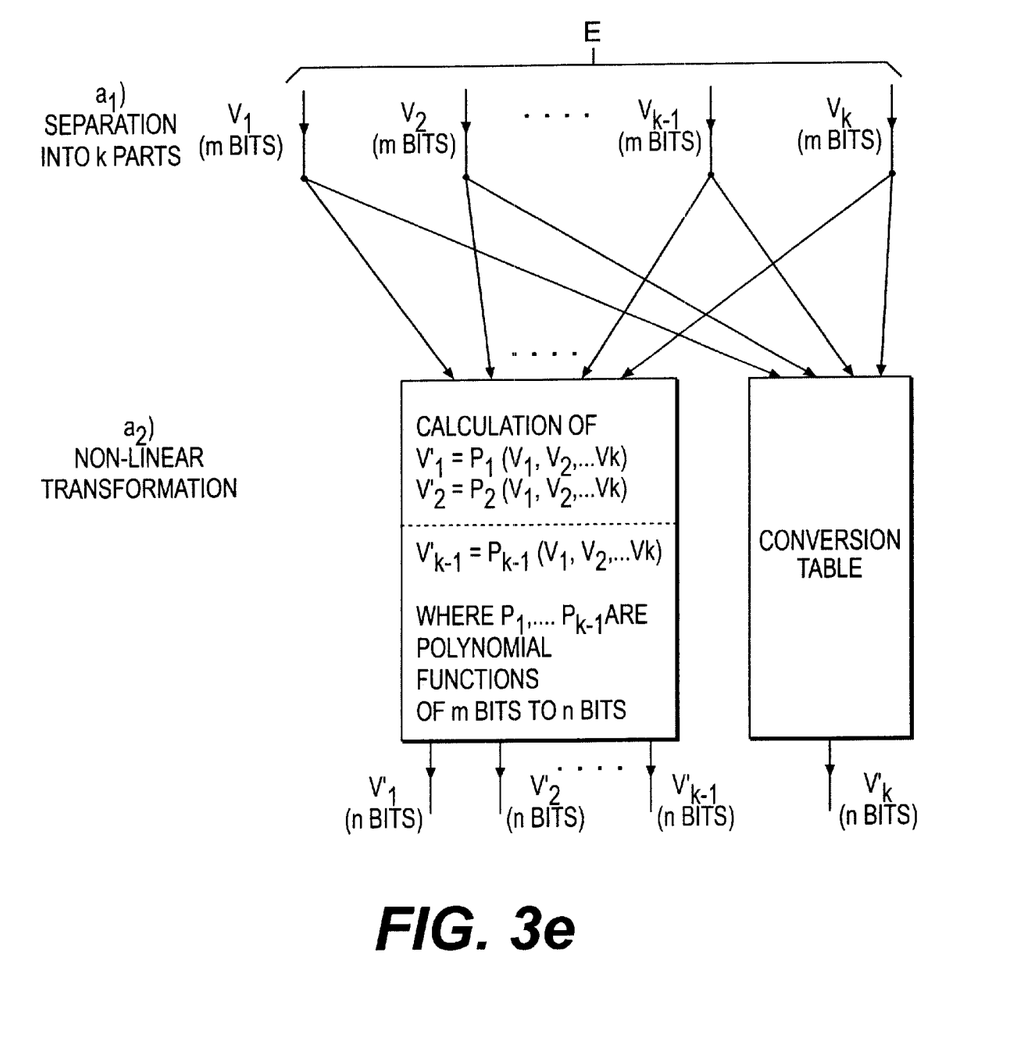
FIG. 3e represents an example illustrating a flow chart of another particular implementation of the process that is the subject of the invention, based on polynomial functions, applied to a nonlinear transformation used in a standard cryptographic calculation process such as the DES.

Thus, as represented in FIG. 3e, in the case of a calculation step of the nonlinear transformation type implemented by a standard cryptographic calculation process such as the DES, in addition to the separation into k parts $v_1$ through $v_k$ of an intermediate variable playing the role of an input E, the nonlinear transformations, for the standard process as well as in the case of FIGS. 3b and 3d, consist of a nonlinear transformation of m bits to n bits, described by conversion tables in which the n output bits of the transformation are read at an address that is a function of the m input bits; according to the process that is the subject of the invention, each nonlinear transformation applied to an intermediate variable of the standard cryptographic calculation process without a separation is replaced by a partial nonlinear transformation of km bits to kn bits applied to all of the partial intermediate variables $v_1$ through $v_k$. In this case, and in reference to Variant No. 4 of Example 2 above, (k−1)n output bits of this transformation are calculated as a polynomial function of the km input bits of the variables $v_1$, $v_2, \ldots, v_k$ in accordance with the relations:

$$v'_1 = P_1(v_1, v_2, \ldots v_k)$$
$$\vdots$$
$$v'_{k-1} = P_{k-1}(v_1, v_2, \ldots v_k),$$

relations in which $P_1$ and $P_{k-1}$ designate polynomial functions of m bits to n bits.

The n remaining bits $v'_k$ of the output variable are then obtained, for example, by reading a nonlinear conversion table in which these n bits are read at an address that is a function of the km input bits.

In Variant No. 4 of the above-mentioned example, it will be recalled that k=2, m=6 and n=4.

Second Example: the Triple DES

The Triple DES consists of sequentially performing encryption/decryption operations using secret keys.

For a description of the Triple DES algorithm, it would be useful to refer to one of the following documents:

ISO/IEC 8732:1987, Banking—Key Management (*Wholesale*);

ANSI X9.17, *American National Standard, Financial Institution Key Management* (*Wholesale*), 1985.

or to the following book:

Bruce Schneier, *Applied Cryptography, 2nd edition*, John Wiley & Sons, 1996, page 358, which are introduced into the present application as references.

The principle consists of using the DES algorithm three times in a row to encrypt a message, beginning by performing a DES operation in the encryption mode with key No. 1, then a DES operation in the decryption mode with key No. 2, and lastly, another DES operation in the encryption mode with key No. 1. The DPA type attack is possible in the same way as for the DES: based on the power consumption measurements performed on the first round of the first DES operation, 48 bits of key No. 1 are found, then by analyzing the second round, the 8 remaining bits of key No. 1 are found. Knowing key No. 1, one therefore knows the inputs of the second DES operation, and can apply the same attack to find key No. 2.

The protection of the algorithm can work exactly as in the case of the simple DES described in the first example above: the same function f is used to perform the "separation" of the intermediate variables, and the same transformations of the algorithm.

Third Example: RSA

RSA is the most famous of the asymmetric cryptographic algorithms. It was developed by Rivest, Shamir and Adleman in 1978. For a more detailed description of this algorithm, it would be useful to refer to the documents below:

R. L. Rivest, A. Shamir, L. M. Adleman, *A Method for Obtaining Digital Signatures and Public-Key Cryptosystems*, Communications of the ACM, 21, No. 2, 1978, pp. 120–126, or to the following documents:

ISO/IEC 9594-8/ITU-T X.509, *Information Technology—Open Systems Interconnection—The directory: Authentication Framework;*

ANSI X9.31-1, *American National Standard, Public-Key Cryptography Using Reversible Algorithms for the Financial Services Industry*, 1993;

PKCS #1, *RSA Encryption Standard*, Version 2, 1998, available at the following address: http://ftp.rsa.com/pub/pkcs/doc/pkcs-1v2.doc, these documents or their publication as HTML pages being introduced into the present specification as references.

The RSA algorithm uses a whole number n that is the product of two large prime numbers p and q, and a whole number e, prime with ppcm(p-1, q-1), and such that $e \neq \pm 1$ mod ppcm(p-1, q-1). The integers n and e constitute the public key. The public key calculation uses the function g of Z/nZ into Z/nZ defined by $g(x)=x^e$ mod n. The secret key calculation uses the function $g^{-1}(y)=y^d$, where n or d is the secret exponent (also called the secret, or private key) defined by $ed \equiv 1$ mod ppcm(p-1, q-1).

Attacks of the DPA or HO-DPA type also pose a threat to the standard implementations of the RSA algorithm. In fact, the latter quite often use the so-called "square and multiply" principle to perform the calculation of $x^d$ mod n. This principle consists of writing the breakdown $d=d_{m-1} \cdot 2^{m-1} + d_{m-2} \cdot 2^{m-2} + \ldots + d_1 \cdot 2^1 + d_0 \cdot 2^0$ of the secret exponent d in base 2, then performing the calculation in the following way:

1. $z \leftarrow 1$;

and for i ranging from m-1 to 0, performing:

2. $z \leftarrow z^2$ mod n;

3. if $d_i=1$, then $z \leftarrow z \cdot x$ mod n.

In this calculation, it is noted that among the successive values assumed by the variable z, the primes are only dependent on a few bits of the secret key d. The fundamental hypothesis that allows the DPA attack is therefore fulfilled. It is then possible to guess, for example, the 10 high-order bits of d by analyzing the power consumption measurements on the part of the algorithm corresponding to i ranging from m-1 to m-10. It is then possible to continue the attack using the power consumption measurements on the part of the algorithm corresponding to i ranging from m-11 to m-20, which makes it possible to find the next 10 bits of d, and so on. Eventually, all the bits of the secret exponent d are found.

The process that is the subject of the present invention also applies to the protection of the RSA algorithm. It uses a separation of each intermediate variable v with values in the multiplicative group of Z/nZ, i.e., all of the modulo n integers that have an inverse that is also modulo n, that occur during the calculation and are dependent on input or output data, into two variables $v_1$ and $v_2$. We take k=2 and we take the function $f(v_1, v_2)=v=v_1 \cdot v_2$ mod n. As shown previously in the description (see Example No. 2, "Protection of the algorithm"), this function f makes it possible to satisfy Condition No. 1.

Hence, x is replaced by $(x_1, x_2)$ such that $x=x_1 \cdot x_2$ mod n and z is replaced by $(z_1, z_2)$ such that $z=z_1 \cdot z_2$ mod n. In practice, it is possible, for example, to choose $x_1$ randomly and deduce $x_2$ from it. Returning now to the three steps of the "square and multiply" method, the following transformations are performed:

1. $<<z \leftarrow 1>>$ is replaced by $<<z_1 \leftarrow 1$ and $z_2 \leftarrow 1>>$;

2. $<<z \leftarrow z^2$ mod n $>>$ is replaced by $<<z^1 \leftarrow z_1^2$ mod n and $z_2 \leftarrow z_2^2$ mod n $>>$;

3. $<<z \leftarrow z \cdot x$ mod n$>>$ is replaced by $<<z_1 \leftarrow z_1 \cdot x_1$ mod n and $z_2 \leftarrow z_2 \cdot x_2$ mod n$>>$.

It is easy to verify that the relation $z=f(z_1, z_2)$ remains true throughout the calculation, which shows that Condition No. 2 is satisfied.

It will be noted that the calculations performed on the variable $z_1$ and on the variable $z_2$, respectively, are completely independent. It is therefore possible for the two calculations to be executed:

sequentially;

in interleaved fashion;

concurrently, in the case of multiprogramming;

or simultaneously in different processors working in parallel.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A process for implementing a standard cryptographic calculation process that uses a secret key to protect a computer system against attacks by physical analysis, wherein said standard cryptographic process produces a standard final value, comprising:

a) separating the standard cryptographic calculation process into a plurality of distinct calculation process parts, b) executing the distinct calculation process parts in parallel to produce partial intermediate variables distinct from any intermediate variables produced using the standard cryptographic calculation; and c) reconstructing a final value that is identical to the standard final value obtained by the standard cryptographic calculation without a separation from said distinct partial intermediate variables whereby the computer system is protected against attacks by physical analysis.

2. A process according to claim 1, wherein for each intermediate variable (v) used by the standard cryptographic calculation process that is dependent on input or output data, further comprising replacing the intermediate variable (v) by a given number k of partial intermediate variables ($v_1, \ldots, v_k$), and linking the intermediate (v) and partial intermediate ($v_1$ through $v_k$) variables by a function f, $v=f(v_1, v_2, \ldots, v_k)$ allowing the reconstruction of said intermediate variable (v).

3. A process according to claim 2, characterized in that said function f linking the partial intermediate variables and said intermediate variable (v) is such that knowledge of a value of said intermediate variable (v) does not allow for deduction of all partial intermediate values $v_i$ such that a (k-1)-tuple ($v_1, \ldots, v_{i-1}, v_{i+1}, \ldots, v_k$) exists that satisfies the equation $f(v_1, \ldots, v_i, \ldots, v_k)=v$.

4. A process according to claim 3, characterized in that said function is a bit-by-bit "exclusive-OR" function, and said intermediate variable (v) and partial intermediate variables ($v_1, \ldots, v_i, \ldots, v_k$) verify the relation:

$$f(v_1, \ldots, v_i, \ldots, v_k) = v_1 * v_2 *, \ldots * v_i * v_k.$$

5. A process according to claim 4, characterized in that, said function f linking the partial intermediate variables and said intermediate variable (v), is such that the distinct calculation process parts executed in parallel are independent, said distinct calculation process parts executed in parallel being executed without a reconstruction of said intermediate variable (v) dependent on input or output data used by said standard cryptographic calculation process.

6. A process according to claim 4, wherein said separation step separates the standard cryptographic process into k parts, and if standard cryptographic calculation process uses nonlinear transformations of m bits to n bits described by conversion tables in which the n output bits of the transformation are read at an address that is a function of the m input bits, further comprising replacing each nonlinear transformation applied to an intermediate variable of the standard cryptographic calculation process without a separation with a partial nonlinear transformation of km bits to kn bits applied to all of the partial intermediate variables, said partial nonlinear transformation being described by k partial conversion tables in which the n output bits of the transformation are read at an address that is a function of the km input bits.

7. A process according to claim 4, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, (k-1)n of said output bits of this transformation being calculated as a polynomial function of the km input bits, and the n remaining bits of said output bits being obtained by reading a conversion table in which the n remaining bits are read at an address that is a function of the km input bits.

8. A process according to claim 4, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, this partial nonlinear transformation being described by k conversion tables, each of these conversion tables receiving as input a value obtained by applying a secret bijective function $*_1$ to said function $f(v_1, \ldots, v_k)$ of the partial intermediate variables according to the relation $*_j*f(v_1, \ldots, v_k)$, $j*[1,k]$, this application $*_j*f(v_1, \ldots, v_k)$ being performed by direct evaluation of a resulting value, this resulting value applied to the input of the conversion table making it possible to read n output bits of the transformation at an address that is a function of these m input bits.

9. A process according to claim 4, wherein said separation step is performed by separating the standard cryptographic process into two distinct parts to be executed in parallel.

10. A process according to claim 2, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, this partial nonlinear transformation being described by k conversion tables, each of these conversion tables receiving as input a value obtained by applying a secret bijective function $*_1$ to said function $f(v_1, \ldots, v_k)$ of the partial intermediate variables according to the relation $*_j*f(v_1, \ldots, v_k)$, $j*[1,k]$, this application $*_j*f(v_1, \ldots, v_k)$ being performed by direct evaluation of a resulting value, this resulting value applied to the input of the conversion table making it possible to read n output bits of the transformation at an address that is a function of these m input bits.

11. A process according to claim 10, characterized in that, among the k partial conversion tables, k-1 partial conversion tables contain secret random values.

12. A process according to claim 10, characterized in that, among the k partial conversion tables used to replace each nonlinear transformation table, the same k-1 conversion tables containing secret random values are used each time.

13. A process according to claim 11, characterized in that, among the k partial conversion tables used to replace each nonlinear transformation table, the same k-1 conversion tables containing secret random values are used each time.

14. A process according to claim 2, wherein said separation step is performed by separating the standard cryptographic process into two distinct parts to be executed in parallel.

15. A process according to claim 2, wherein said separation step separates the standard cryptographic process into k parts, and if standard cryptographic calculation process uses nonlinear transformations of m bits to n bits described by conversion tables in which the n output bits of the transformation are read at an address that is a function of the m input bits, further comprising replacing each nonlinear transformation applied to an intermediate variable of the standard cryptographic calculation process without a separation with a partial nonlinear transformation of km bits to kn bits applied to all of the partial intermediate variables, said partial nonlinear transformation being described by k partial conversion tables in which the n output bits of the transformation are read at an address that is a function of the km input bits.

16. A process according to claim 2, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, (k−1)n of said output bits of this transformation being calculated as a polynomial function of the km input bits, and the n remaining bits of said output bits being obtained by reading a conversion table in which the n remaining bits are read at an address that is a function of the km input bits.

17. A process according to claim 3, characterized in that for an intermediate variable (v) with values in the multiplicative group Z/nZ defined by all of the modulo n integers, said function is the modulo n product function $f(v_1, \ldots, v_k)=v_1*v2 \ldots v_k$ modulo n, in which said partial intermediate variables are variables with values in said multiplicative group of Z/nZ.

18. A process according to claim 17, characterized in that, said function f linking the partial intermediate variables and said intermediate variable (v), is such that the distinct calculation process parts executed in parallel are independent, said distinct calculation process parts executed in parallel being executed without a reconstruction of said intermediate variable (v) dependent on input or output data used by said standard cryptographic calculation process.

19. A process according to claim 17, wherein said separation step is performed by separating the standard cryptographic process into two distinct parts to be executed in parallel.

20. A process according to claim 17, wherein said separation step separates the standard cryptographic process into k parts, and if standard cryptographic calculation process uses nonlinear transformations of m bits to n bits described by conversion tables in which the n output bits of the transformation are read at an address that is a function of the m input bits, further comprising replacing each nonlinear transformation applied to an intermediate variable of the standard cryptographic calculation process without a separation with a partial nonlinear transformation of km bits to kn bits applied to all of the partial intermediate variables, said partial nonlinear transformation being described by k partial conversion tables in which the n output bits of the transformation are read at an address that is a function of the km input bits.

21. A process according to claim 17, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, (k−1)n of said output bits of this transformation being calculated as a polynomial function of the km input bits, and the n remaining bits of said output bits being obtained by reading a conversion table in which the n remaining bits are read at an address that is a function of the km input bits.

22. A process according to claim 17, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, this partial nonlinear transformation being described by k conversion tables, each of these conversion tables receiving as input a value obtained by applying a secret bijective function $*_1$ to said function $f(v_1, \ldots, v_k)$ of the partial intermediate variables according to the relation $*_j*f(v_1, \ldots, v_k)$, $j*[1,k]$, this application $*_j*f(v_1, \ldots, v_k)$ being performed by direct evaluation of a resulting value, this resulting value applied to the input of the conversion table making it possible to read n output bits of the transformation at an address that is a function of these m input bits.

23. A process according to claim 3, characterized in that, said function f linking the partial intermediate variables and said intermediate variable (v), is such that the distinct calculation process parts executed in parallel are independent, said distinct calculation process parts executed in parallel being executed without a reconstruction of said intermediate variable (v) dependent on input or output data used by said standard cryptographic calculation process.

24. A process according to claim 23, wherein said separation step is performed by separating the standard cryptographic process into two distinct parts to be executed in parallel.

25. A process according to claim 23, wherein said separation step separates the standard cryptographic process into k parts, and if standard cryptographic calculation process uses nonlinear transformations of m bits to n bits described by conversion tables in which the n output bits of the transformation are read at an address that is a function of the m input bits, further comprising replacing each nonlinear transformation applied to an intermediate variable of the standard cryptographic calculation process without a separation with a partial nonlinear transformation of km bits to kn bits applied to all of the partial intermediate variables, said partial nonlinear transformation being described by k partial conversion tables in which the n output bits of the transformation are read at an address that is a function of the km input bits.

26. A process according to claim 23, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, (k−1)n of said output bits of this transformation being calculated as a polynomial function of the km input bits, and the n remaining bits of said output bits being obtained by reading a conversion table in which the n remaining bits are read at an address that is a function of the km input bits.

27. A process according to claim 23, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, this partial nonlinear transformation being described by k conversion tables, each of these conversion tables receiving as input a value obtained by applying a secret bijective function $*_1$ to said function $f(v_1, \ldots, v_k)$ of the partial intermediate variables according to the relation $*_j*f(v_1, \ldots, v_k)$, $j*[1,k]$, this application $*_j*f(v_1, \ldots, v_k)$ being performed by direct evaluation of a resulting value, this resulting value applied to the input of the conversion table making it possible to read n output bits of the transformation at an address that is a function of these m input bits.

28. A process according to claim 3, wherein said separation step is performed by separating the standard cryptographic process into two distinct parts to be executed in parallel.

29. A process according to claim 3, wherein said separation step separates the standard cryptographic process into k parts, and if standard cryptographic calculation process uses nonlinear transformations of m bits to n bits described by conversion tables in which the n output bits of the transformation are read at an address that is a function of the m input bits, and further comprising replacing each nonlinear transformation applied to an intermediate variable of the standard cryptographic calculation process without a separation with a partial nonlinear transformation of km bits to kn bits applied to all of the partial intermediate variables, said partial nonlinear transformation being described by k partial conversion tables in which the n output bits of the transformation are read at an address that is a function of the km input bits.

30. A process according to claim 3, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, (k−1)n of said output bits of this transformation being calculated as a polynomial function of the km input bits, and the n remaining bits of said output bits being obtained by reading a conversion table in which the n remaining bits are read at an address that is a function of the km input bits.

31. A process according to claim 3, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, this partial nonlinear transformation being described by k conversion tables, each of these conversion tables receiving as input a value obtained by applying a secret bijective function $*_1$ to said function $f(v_1, \ldots, v_k)$ of the partial intermediate variables according to the relation $*_j*f(v_1, \ldots, v_k)$, $j*[1,k]$, this application $*_j*f(v_1, \ldots, v_k)$ being performed by direct evaluation of a resulting value, this resulting value applied to the input of the conversion table making it possible to read n output bits of the transformation at an address that is a function of these m input bits.

32. A process according to claim 1, wherein said separation step is performed by separating the standard cryptographic process into two distinct parts to be executed in parallel.

33. A process according to claim 1, wherein said separation step separates the standard cryptographic process into k parts, and if standard cryptographic calculation process uses nonlinear transformations of m bits to n bits described by conversion tables in which the n output bits of the transformation are read at an address that is a function of the m input bits, further comprising replacing each nonlinear transformation applied to an intermediate variable of the standard cryptographic calculation process without a separation with a partial nonlinear transformation of km bits to kn bits applied to all of the partial intermediate variables, said partial nonlinear transformation being described by k partial conversion tables in which the n output bits of the transformation are read at an address that is a function of the km input bits.

34. A process according to claim 33, characterized in that among the k partial conversion tables, k−1 partial conversion tables contain secret random variables.

35. A process according to claim 34, characterized in that among the k partial conversion tables used to replace each nonlinear conversion table, the same k−1 table, the same k−1 tables containing secret random variables are used each time.

36. A process according to claim 33, characterized in that among the k partial conversion tables used to replace each nonlinear conversion table, the same k−1 secret random tables are used each time.

37. A process according to claim 1, characterized in that said separation is performed in k parts, and in that for a standard cryptographic calculation process that uses nonlinear transformations of m bits to n bits described by conversion tables in which the n output bits of the transformation are read at an address that is a function of the m input bits, each nonlinear transformation applied to an intermediate variable of the standard cryptographic calculation process without a separation is replaced by a partial nonlinear transformation of km bits to kn bits applied to all of the partial intermediate variables, (k−1)n of said output bits of this transformation being calculated as a polynomial function of the km input bits, and the n remaining bits of said output bits being obtained by reading a conversion table in which the n remaining bits are read at an address that is a function of the km input bits.

38. A process according to claim 1, further comprising sequentially executing the operations performed in the various parts derived from the separation of the cryptographic calculation process into several distinct calculation process parts.

39. A process according to claim 1, further comprising executing the operations performed in the various parts derived from the separation of the cryptographic calculation process into several distinct calculation process parts in interleaved fashion.

40. A process according to claim 1, further comprising when multiprogramming, concurrently executing the operations performed in the various parts derived from the separation of the cryptographic calculation process into several distinct calculation process parts.

41. A process according to claim 1, further comprising simultaneously executing in different processors working in parallel the operations performed in the various parts derived from the separation of the cryptographic calculation process into several distinct calculation process parts.

42. Implementing the process according to claim 1 in a smart card.

43. A process according to claim 1 wherein the cryptographic calculation process is supported by an algorithm selected from the group consisting of the DES, Triple DES and RSA algorithms.

* * * * *

UNITED STATES PATENT AND TRADEMARK OFFICE
CERTIFICATE OF CORRECTION

PATENT NO.    : 6,658,569 B1
DATED         : December 2, 2003
INVENTOR(S)   : Patarin et al.

It is certified that error appears in the above-identified patent and that said Letters Patent is hereby corrected as shown below:

<u>Title page,</u>
Insert Item -- [30] Foreign Application Priority Data February 4, 1999   (FR)......99 01289 --

Signed and Sealed this

Seventeenth Day of August, 2004

JON W. DUDAS
*Acting Director of the United States Patent and Trademark Office*